United States Patent
Sugiura et al.

(10) Patent No.: US 7,449,110 B2
(45) Date of Patent: Nov. 11, 2008

(54) FILTER AND FILTER MODULE

(75) Inventors: Kiyotaka Sugiura, Nagoya (JP); Nobuhiro Aoki, Nagoya (JP); Hiroyuki Oyachi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 568 days.

(21) Appl. No.: 10/542,950

(22) PCT Filed: Feb. 18, 2004

(86) PCT No.: PCT/JP2004/001770

§ 371 (c)(1),
(2), (4) Date: Jul. 21, 2005

(87) PCT Pub. No.: WO2004/073842

PCT Pub. Date: Sep. 2, 2004

(65) Prior Publication Data

US 2006/0123753 A1    Jun. 15, 2006

(30) Foreign Application Priority Data

Feb. 21, 2003   (JP) ............................. 2003-043729

(51) Int. Cl.
*B01D 63/06* (2006.01)

(52) U.S. Cl. ............... 210/321.87; 55/482; 55/523; 96/9; 96/10; 96/11; 210/321.78; 210/489; 210/510.1

(58) Field of Classification Search .......... 55/482, 55/485, 483, 523; 96/8–10, 4, 11; 210/321.78–321.8, 210/321.87–321.89, 500.23, 451, 455, 488, 210/489, 490, 500.21, 510.1
See application file for complete search history.

(56) References Cited

U.S. PATENT DOCUMENTS

| | | | | |
|---|---|---|---|---|
| 4,069,157 A | * | 1/1978 | Hoover et al. | 210/321.82 |
| 5,376,167 A | * | 12/1994 | Broutin et al. | 96/8 |
| 5,614,001 A | * | 3/1997 | Kosaka et al. | 96/10 |
| 6,447,679 B1 | * | 9/2002 | Watari et al. | 210/500.23 |
| 6,858,063 B2 | * | 2/2005 | Watari et al. | 95/45 |
| 6,860,922 B2 | * | 3/2005 | Watari et al. | 96/6 |
| 7,329,310 B2 | * | 2/2008 | Olapinski et al. | 95/273 |
| 2001/0013272 A1 | * | 8/2001 | Blase et al. | 96/8 |
| 2003/0102258 A1 | | 6/2003 | Olapinski et al. | |
| 2005/0217485 A1 | | 10/2005 | Olapinski et al. | |

FOREIGN PATENT DOCUMENTS

| | | |
|---|---|---|
| FR | 2061933 | 6/1971 |
| JP | 02-237622 | 9/1990 |
| JP | 06-015148 | 1/1994 |
| JP | 10-180049 | 7/1998 |
| WO | 01/74477 | 10/2001 |

* cited by examiner

*Primary Examiner*—Duane Smith
*Assistant Examiner*—Robert A Clemente
(74) *Attorney, Agent, or Firm*—Burr & Brown

(57) ABSTRACT

The filter 1 of the present invention has at least two filter elements 2 contained in the casing 4, which are connected in series in such a state as interposing the first sealer 5 between them.

12 Claims, 8 Drawing Sheets

FILTER AND FILTER MODULE

The present application is based on International Application PCT/JP2004/001770, filed Feb. 18, 2004, which application is incorporated herein by reference in its entirety.

FIELD OF THE INVENTION

The present invention relates to a filter comprising a casing and a filter element comprising a porous body put in the casing, and to a filter module. More particularly, it relates to a filter large in throughput capacity per installing area (namely, large in throughput capacity with saving of space), and a filter module suitably usable for the filter.

BACKGROUND OF THE INVENTION

Recently, there have been used filter elements comprising a porous body as a filter medium for removing suspended materials, bacteria and dusts in liquid in a wide variety of the fields such as of water treatment, medicine and food.

Porous bodies of various shapes are used as the above filter elements depending on the purpose of filtration, and, for example, a filter element 2 as shown in FIG. 2 is generally used which has a substrate comprising a cylindrical porous body having many pores and having a plurality of cells 3 which are flow paths for untreated liquid (hereinafter, such a shape is sometimes referred to as "monolithic") and a filtering membrane comprising a porous body which has an average pore diameter smaller than that of the substrate and is formed on the inner wall of a plurality of the cells 3.

In the above-mentioned monolithic filter element, when an untreated liquid (a liquid to be treated) is supplied into a plurality of the cells under a given pressure, the liquid permeates through the filtering membrane formed on the inner wall of the cells and the porous body constituting the substrate and is discharged through the outer peripheral surface of the substrate, during which the suspended material is entrapped by the filtering membrane. Therefore, the purified liquid can be recovered by employing a structure where the filter element is contained in the casing in such a state that the outer peripheral surface side and the cell opening end face side of the substrate are liquidtightly separated from each other by a sealer. Furthermore, since the average pore diameter of the filtering membrane (about 0.01-1.0 $\mu$m) is made smaller than that of the substrate (1-several hundred $\mu$m), the filtering performance is assured and, besides, the flow resistance at the time of the permeation of liquid through the porous body constituting the substrate can be reduced and thus the fluid permeation amount (namely, throughput capacity) can be improved.

The monolithic filter elements mentioned above can be used each alone, but when a large amount of untreated liquid (untreated water) is required to be treated as in the case of water treatment plant, many filter elements are connected to increase the filtration area and improve the throughput capacity.

As a filter comprising many filter elements which are connected, there is known, for example, a filter in which many filter elements are contained in a casing in such a state that they are supported by piercing both ends of the filter elements through an upper plate and a lower plate, respectively, and they are arranged in parallel (see, for example, JP-A-10-180049).

However, if it is attempted to improve the throughput capacity by increasing the number of the filter elements to be connected to increase the filtration area, the installing area of the filter must be increased in proportion to the number of the filter elements and the throughput capacity per installing area of the filter is small.

SUMMARY OF THE INVENTION

The present invention has been made in an attempt to solve the above problems, and provides a filter which exerts advantageous effects as compared with those of conventional filters large in throughput capacity per installing area (namely, large in throughput capacity with saving of spaces), and a filter module usable suitably for the filter.

As a result of intensive research conducted by the inventors, it has been conceived that the above problems can be solved by connecting in series at least two filter elements contained in a casing in such a state as interposing a sealer between them, and thus the present invention has been accomplished. That is, the present invention provides the following filters and filter modules.

[1] A filter which has at least two filter elements having a substrate comprising a cylindrical porous body having many pores and having a plurality of cells as flow paths of untreated liquid and a filtering membrane comprising a porous body smaller in average pore diameter than that of the substrate and formed on the inner wall of a plurality of the cells, and said at least two filter elements are contained in a casing, wherein said at least two filter elements contained in the casing are connected in series in such a state as interposing a first sealer therebetween, and the first sealer liquidtightly separates a plurality of the cells from a space formed between the outer peripheral surface of said at least two filter elements and the inner peripheral surface of the casing and does not hinder a plurality of the cells of said at least two filter elements from communicating with each other.

[2] A filter described in the above [1], wherein the substrate and filtering membrane constituting the filter elements comprise a ceramic.

[3] A filter described in the above [1] or [2], wherein the first sealer is a seal cap.

[4] A filter described in any one of the above [1]-[3], wherein said at least two filter elements are connected in series in such a state that a supporting plate is provided therebetween; the first sealer is interposed between said at least two filter elements and the supporting plate; and the supporting plate has a first opening which allows a plurality of the cells of said at least two filter elements to communicate with each other and a second opening which allows the spaces formed between the outer peripheral surface of said at least two filter elements and the inner peripheral surface of the casing to communicates with each other.

[5] A filter described in the above [4], wherein the casing comprises at least two hollow cylindrical cases having a flange at the end part, said at least two hollow cylindrical cases are connected in series in such a state as the supporting plate is provided between the flanges, and a second sealer is interposed between the flange and the supporting plate, the second sealer liquid-tightly separates the space formed between the outer peripheral surface of said at least two filter elements and the inner peripheral surface of the hollow cylindrical case from the external space of the hollow cylindrical case and does not hinder the spaces formed between the outer peripheral surface of said at least two filter elements and the inner peripheral surface of the hollow cylindrical case from communicating with each other.

[6] A filter module in which a filter element having a substrate comprising a cylindrical porous body having many pores and having a plurality of cells as flow paths for untreated liquid and a filtering membrane comprising a porous body smaller in average pore diameter than that of the substrate and formed on the inner wall of a plurality of the cells contained in a hollow cylindrical case having flanges at both end parts, wherein the filter element is contained in the hollow cylindrical case in such a state as both end faces being supported by a supporting plate and a first sealer is interposed between the filter element and the supporting plate; the supporting plate has a first opening communicating with a plurality of the cells of the filter element and a second opening communicating with a space formed between the outer peripheral surface of the filter element and the inner peripheral surface of the hollow cylindrical case; and the first sealer liquid-tightly separates a plurality of the cells from the space formed between the outer peripheral surface of the filter element and the inner peripheral surface of the hollow cylindrical case and does not hinder a plurality of the cells of the filter element and the first opening from communicating with each other.

[7] A filter module described in the above [6], wherein the substrate and filtering membrane constituting the filter element comprise a ceramic.

[8] A filter module described in the above [6] or [7], wherein the first sealer is a seal cap.

[9] A filter module described in any one of the above [6]-[8], wherein a second sealer is interposed between both flanges of the hollow cylindrical case and the supporting plate, and the second sealer liquid-tightly separates a space formed between the outer peripheral surface of said at least two filter elements and the inner peripheral surface of the hollow cylindrical case from the external space of the hollow cylindrical case and does not hinder the second opening of the supporting plate and the space formed between the outer peripheral surface of the filter element and the inner peripheral surface of the hollow cylindrical case from communicating with each other.

[10] A filter module described in the above [9], wherein the supporting plate and the flanges of the hollow cylindrical case have a bolt hole into which a bolt for bonding the supporting plate and the flange can be screwed, and a dent in which the head of the bolt can be put is formed at the bolt hole of the supporting plate.

[11] A filter having at least two filter modules described in any one of [6]-[10] which are connected in series, wherein said at least two filter modules are connected in series in such a state as interposing a third sealer and a fourth sealer therebetween, the third sealer liquid-tightly separates the first opening of the supporting plate from the second opening of the supporting plate constituting said at least two filter modules and does not hinder the first openings of at least two filter modules from communicating with each other, and the fourth sealer liquid-tightly separates the second opening of the supporting plate constituting at least two filter modules from the external space of the filter modules and does not hinder communication of the second openings of at least two filter modules with each other.

[12] A filter described in the above [11], wherein a purified liquid recovery port is provided at only the filter module connected at the uppermost part of the filter among at least two filter modules connected in series.

BRIEF DESCRIPTION OF DRAWINGS

FIG. 3(a) is a top view of the seal cap and FIG. 3(b) is a sectional view taken on line A-A' of FIG. 3(a).

FIG. 4(a) is a top view and FIG. 4(b) is a sectional view taken on line A-A' of FIG. 4(a).

FIG. 7(a) is a side sectional view in which a bolt is not fitted and FIG. 7(b) is a side sectional view in which a bolt is fitted.

DETAIL DESCRIPTION OF THE INVENTION (1) Filter (Element Connection Type)

The filter (element connection type) of the present invention has a structure in which at least two filter elements contained in a casing are connected in series in such a state as interposing a sealer between them. The filter having such a structure can be installed utilizing effectively the space in upper and lower directions, and, hence, can be enhanced in throughput capacity per installing area as compared with conventional filters where many filter elements are disposed in parallel in a casing (see JP-A-10-180049). That is, the filter of the present invention is large in throughput capacity with saving of space.

Figure 1:
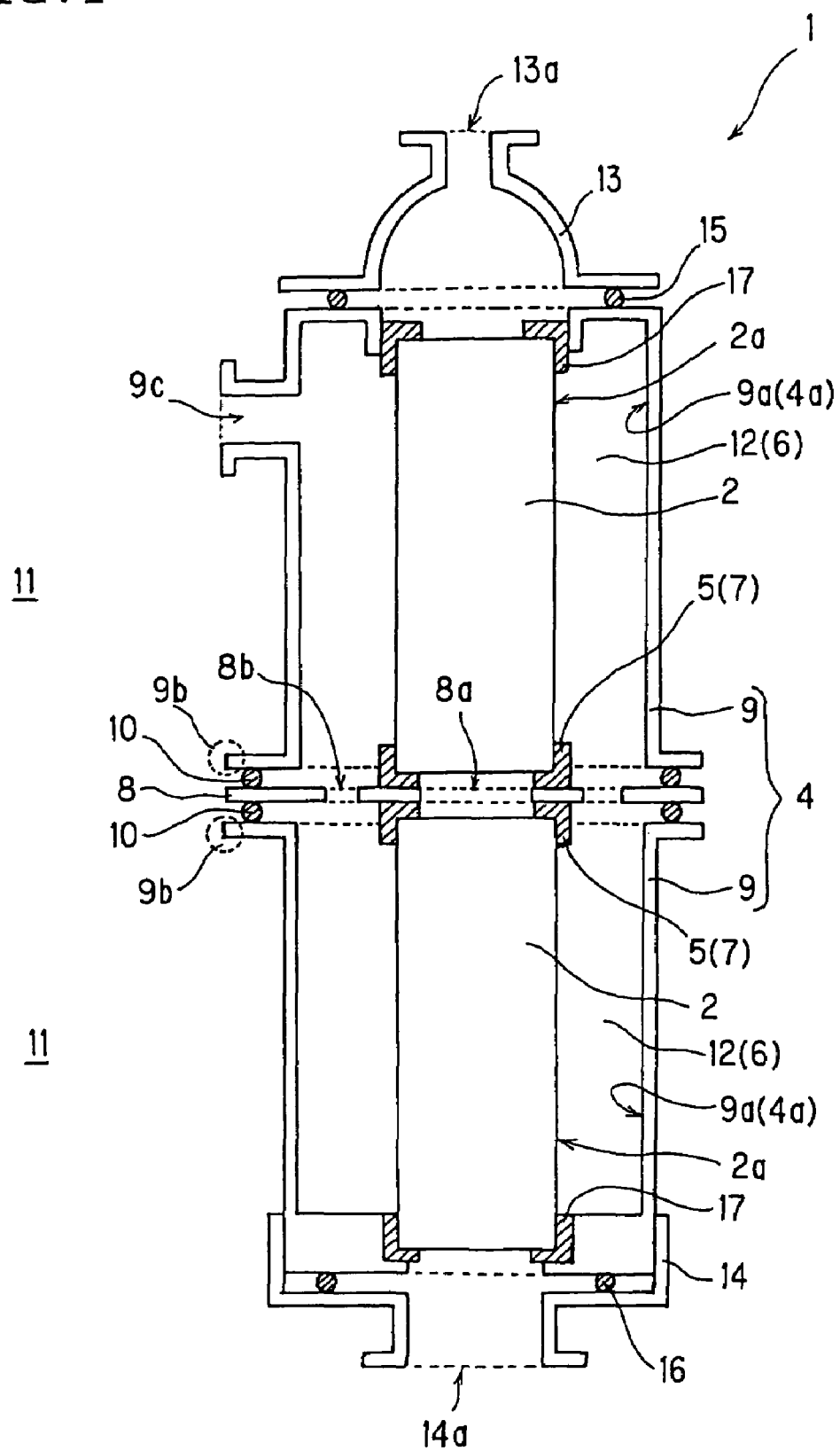
FIG. 1 is a side sectional view which schematically shows one embodiment of the filter of the present invention.

The filter (element connection type) of the present invention will be specifically explained referring to the drawings. FIG. 1 is a side sectional view which schematically shows one embodiment of the filter of the present invention.

As shown in FIG. 1, the filter 1 of the present invention has at least two filter elements 2, which are contained in a casing 4. In this specification, the term "casing" means the whole container which contains all filter elements used for the filter. The constituent material of the casing is not particularly limited, and preferred are those which are impermeable to water and high in corrosion resistance (e.g., stainless steel).

Figure 2:
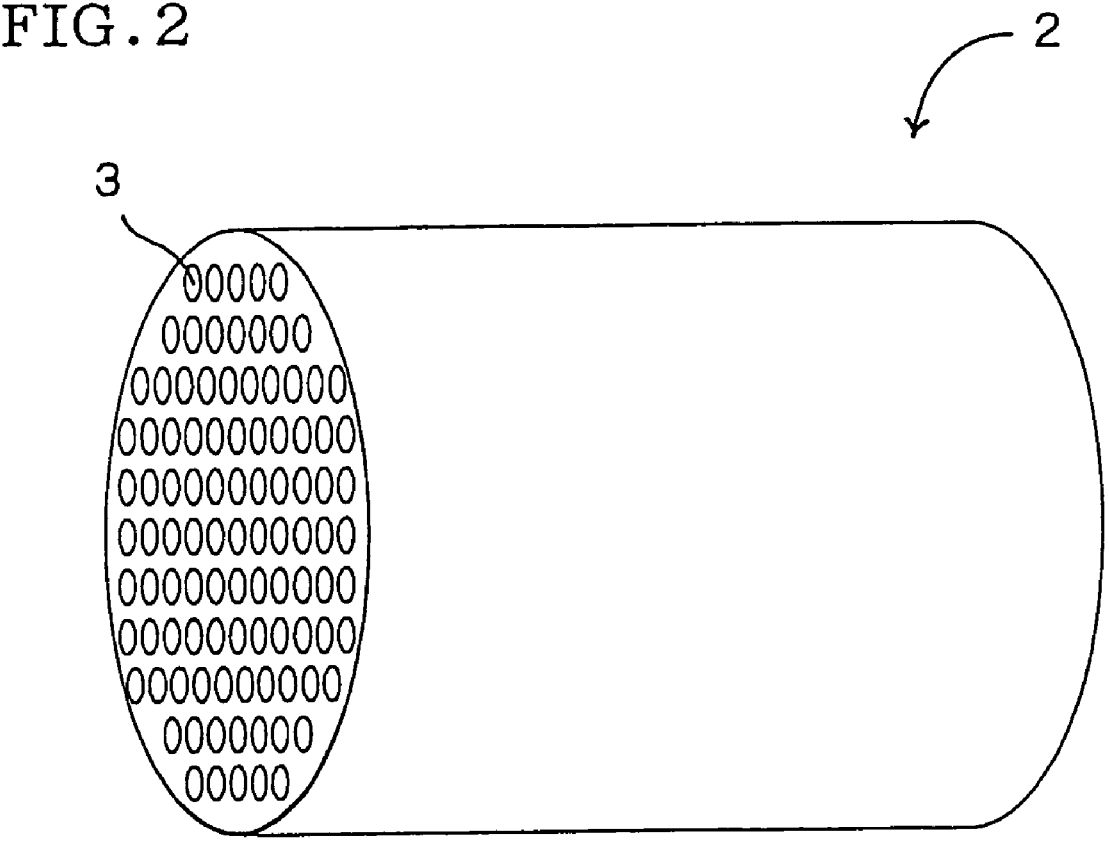
FIG. 2 is an oblique view which schematically shows one embodiment of filter element.

As shown in FIG. 2, the filter element 2 comprises a cylindrical porous body having many pores and has a substrate having a plurality of cells which are flow paths of liquid to be treated and a filtering membrane comprising a porous body having pores smaller in average pore diameter than those of the substrate and formed on the inner wall of a plurality of the cells 3. Specific values of the average pore diameter of the porous body constituting the filtering membrane and specific values of the average pore diameter of the porous body constituting the substrate are optionally selected depending on the required filter performance (particle diameter of substances to be captured) or fluid permeation amount (namely, throughput capacity), and, in many cases, the average pore diameter of the porous body constituting the filtering membrane is about 0.01-1.0 μm and the average pore diameter of the porous body constituting the substrate is 1—several hundred μm. Between the substrate and the filtering membrane, there may be formed an intermediate membrane comprising a porous body having an average pore diameter which is intermediate between the average pore diameter of the substrate and that of the filtering membrane.

The shape of the filter element is not particularly limited so long as it is a cylindrical body, so-called monolithic body having a plurality of cells (through-holes) which are flow paths of liquid to be treated. As the whole shape, mention may be made of, for example, cylindrical shape as shown in FIG. 2, and, besides, quadrangular prism, triangular prism, or the like. As to the shape of cells of the filter element (the shape of cells at a section perpendicular to the direction of formation of the cells), mention may be made of, for example, circular cells as shown in FIG. 2, and, besides, tetragonal cells, hexagonal cells, triangular cells, or the like.

The substrate and the filtering membrane (and intermediate membrane) constituting the filter element may comprise an organic polymer such as cellulose acetate, polyvinylidene fluoride (PVDF), polypropylene (PP) or polyethylene (PE), but preferably comprise a ceramic. This is because ceramics are superior to organic polymers in physical strength and endurance and hence have higher reliability and higher corrosion resistance to cause less deterioration even after cleaning with acids, alkalis or the like, and, furthermore, accurate control of average pore diameter which determines filtrating ability is possible. The ceramics are not particularly limited, and there may be suitably used, for example, cordierite, mullite, alumina, aluminum titanate, lithium aluminum silicate, silicon carbide and silicon nitride.

It is preferred to form a coat comprising a liquid impermeable material (such as glass) on the end face of the filter element other than cell opening portion (see, for example, JP-A-61-8106 and JP-A-2001-300273). Since the filtering membrane is not formed on the end face of the filter element and the substrate of relatively large average pore diameter is exposed at the end face, the liquid to be treated sometimes penetrates into the substrate from the end face and may incorporate into a purified liquid which has already passed through the filtering membrane. By forming the above-mentioned coat, incorporation of untreated liquid into the purified liquid can be avoided and contamination of the purified liquid can be inhibited.

As shown in FIG. 1, the filter 1 of the present invention has such a structure that at least two filter elements 2 contained in the casing 4 are connected in series with interposing a first sealer 5 between them. In this specification, the term "connected in series" means such a state that at least two filter elements are connected in the direction of formation of the cells (axial direction of the cylindrical body). The term "at least two" means that three or more filter elements may be connected in series.

It is necessary that the first sealer 5 has two functions of (1) liquid-tightly separating a plurality of the cells (of the filter elements 2) from a space 6 formed between the outer peripheral surface 2a of at least two filter elements 2 and the inner peripheral surface 4a of the casing 4 and (2) not hindering a plurality of the cells of at least two filter elements from communicating with each other.

As far as the first sealer has the above two functions, the shape, structure and constituent material of the first sealer are not particularly limited, and it may be, for example, an O-ring or a ring-shaped flat packing made of an elastic material such as rubber. The above two functions can be secured by disposing the O-ring or ring-shaped flat packing to encircle all of the openings of a plurality of the cells along the outer edge of the end face of the filter element.

The first sealer in the filter (element connection type) of the present invention is preferably a seal cap (a seal cap 7 is also used as the first sealer 5 in the filter 1 shown in FIG. 1). The term "seal cap" in this specification means a cap-shaped sealer used being attached to the end portion of a cylindrical body such as the filter element (see, for example, JP-A-10-184919). The cap-shaped sealer is preferred in that it can be simply and securely fixed to the filter element and furthermore can secure a higher liquid-tightness as compared with the O-ring and ring-shaped flat packing.

Figure 3A:
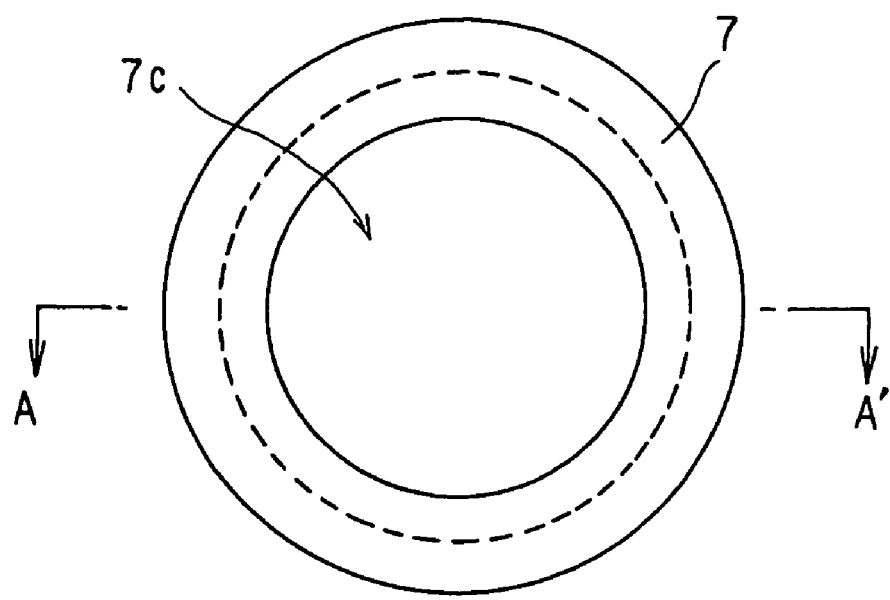
FIG. 3(a) and FIG. 3(b) schematically show one embodiment of seal cap.
Figure 3B:
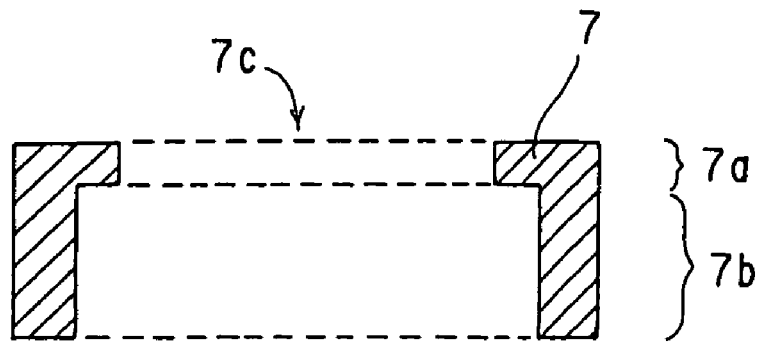

FIG. 3(a) and FIG. 3(b) schematically show one embodiment of the seal cap, and FIG. 3(a) is a top view and FIG. 3(b) is a sectional view taken on line A-A' of FIG. 3(a). The seal cap 7 shown in FIG. 3(a) and FIG. 3(b) is a ring member having an L-shaped section and comprises a trunk part 7b extending in vertical direction and a top part 7a extending in horizontal direction and having a central opening 7c.

Figure 4A:
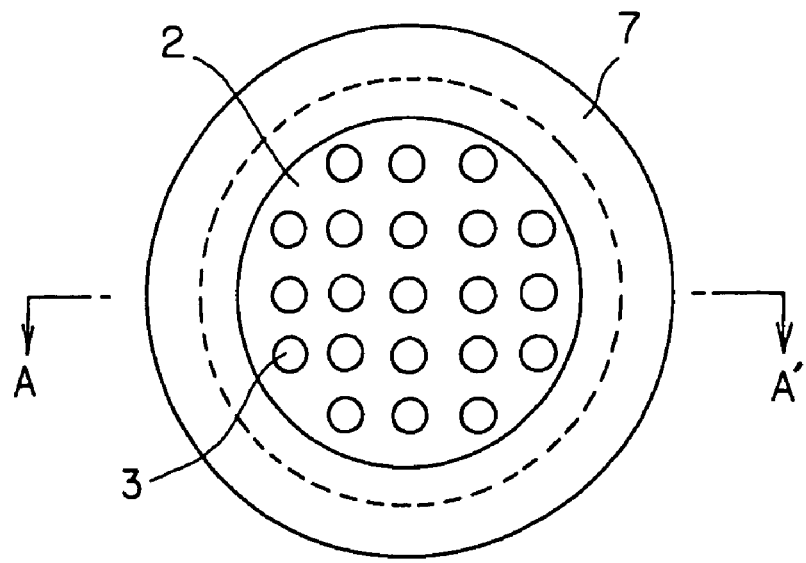
FIG. 4(a) and FIG. 4(b) schematically show the seal cap as used.
Figure 4B:
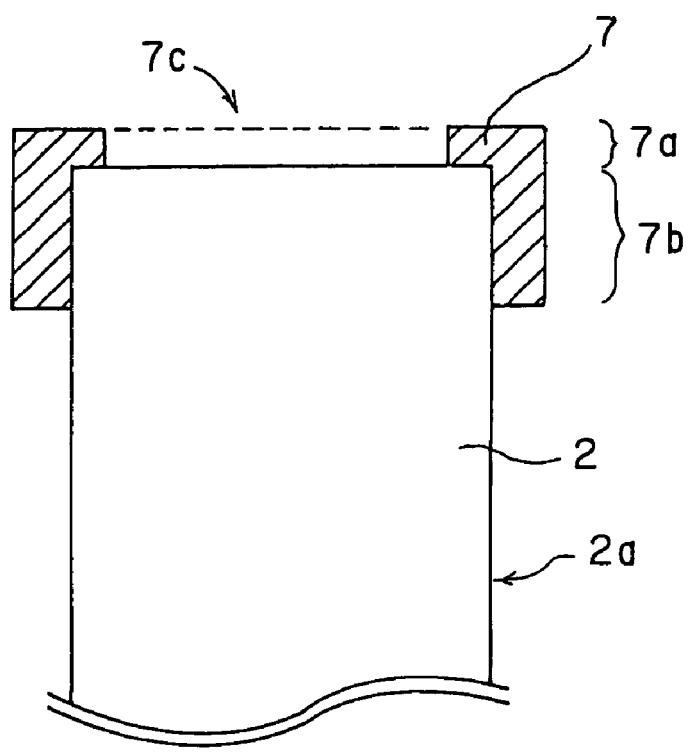

FIG. 4(a) and FIG. 4(b) schematically show the seal cap as used, and FIG. 4(a) is a top view and FIG. 4(b) is a sectional view taken on line A-A' of FIG. 4(a). As shown in FIG. 4(a) and FIG. 4(b), the seal cap 7 is attached to the end portion of the filter element 2 in such a manner that the trunk part 7b closely contacts with the outer peripheral surface 2a of the filter element 2 and the top part 7a closely contacts with the end face of the filter element 2. The central opening 7c is formed so that all of a plurality of the cells of the filter elements 2 are exposed and a plurality of the cells of the filter elements 2 connected in series are not hindered to communicate with each other.

As the structure of at least two filter elements being connected in series with interposing the first sealer between them, there may be considered such a structure as at least two filter elements being connected in series with interposing only the first sealer between them, but preferred is such a structure that as shown in FIG. 1, at least two filter elements 2 are connected in series with interposing a supporting plate 8, and the first sealer 5 is interposed between at least two filter elements 2 and the supporting plate 8.

Figure 5:
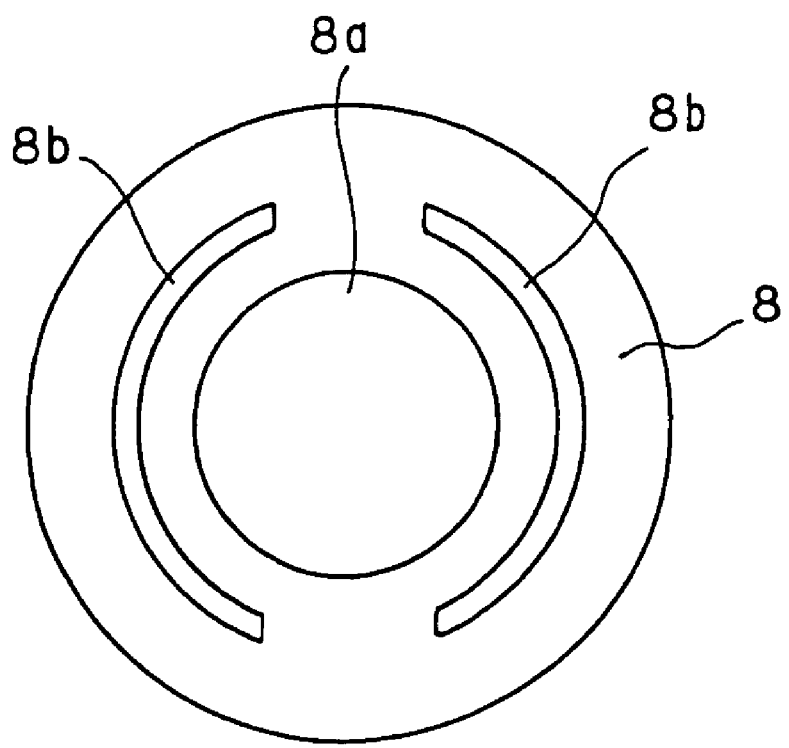
FIG. 5 is a top view which schematically shows one embodiment of a supporting plate used in the filter of the present invention.

The supporting plate 8 has a first opening 8a which allows a plurality of the cells of at least two filter elements 2 to communicate with each other and a second opening 8b which allows spaces 6 formed between the outer peripheral surface 2a of at least two filter elements 2 and the inner peripheral surface 4a of the casing 4 to communicate with each other. The shape of the supporting plate 8 is not particularly limited, and there may be suitably used a circular plate having a circular first opening 8a at the center of the plate and nearly U-shaped second openings 8b around the first opening as shown in FIG. 5. The constituent materials of the supporting plate are not particularly limited, and those which are water impermeable and high in corrosion resistance (e.g., stainless steel) can be suitably used.

In the case of the above-mentioned structure having a supporting plate, preferred structure is such that the casing 4 comprises at least two hollow cylindrical cases 9 having a flange 9b at the end part thereof, at least two hollow cylindrical cases 9 are connected in series in such a state as the supporting plate 8 being present between the flanges 9b, and a second sealer 10 is interposed between the flange 9b and the supporting plate 8.

It is necessary that the second sealer 10 has two functions of (1) liquid-tightly separating a space 12 formed between the outer peripheral surface 2a of at least two filter elements 2 and the inner peripheral surface 9a of the hollow cylindrical case 9 from the external space 11 of the hollow cylindrical case 9 and (2) not hindering the spaces 12 formed between the outer peripheral surface 2a of at least two filter elements 2 and the inner peripheral surface 9a of the hollow cylindrical case 9 from communicating with each other.

As far as the second sealer has the above two functions, the shape, structure and constituent material of the second sealer are not particularly limited, and it may be, for example, an O-ring or ring-shaped flat packing made of an elastic material such as rubber. The above two functions can be secured by disposing the O-ring or ring-shaped flat packing so as to encircle the second opening of the supporting plate along the outer edge of the supporting plate (or the flange of the hollow cylindrical case).

A dented groove for disposing and fixing the second sealer may be provided at the flange of the hollow cylindrical case and/or supporting plate. By providing the dented groove, the second sealer can be easily disposed and more securely fixed. The fixing method of the flange of the hollow cylindrical case and the supporting plate is not particularly limited, and there is a method of making a bolt hole in the portion of the flange of the hollow cylindrical case and the portion of the supporting plate which are on the outer peripheral side of the portion where the second sealer is disposed, and fixing them by a bolt and a nut.

The filter (element connection type) of the present invention can be constructed in the same manner as in construction of conventional filters, except that at least two filter elements contained in the casing are connected in series in the state of interposing a sealer between them, and the overall structure is not particularly limited and, for example, the filter can be constructed in such a manner as in the filter 1 shown in FIG. 1.

In the filter 1, two filter elements 2 are connected in series in such a state that a plurality of cells of the filter elements 2 are liquid-tightly separated by seal caps 7 and 17 from a space 12 formed between the outer peripheral surface 2*a* of the filter element 2 and the inner peripheral surface 9*a* of the hollow cylindrical case 9 and the two filter elements 2 are contained in the hollow cylindrical case 9 (namely, casing 4). A top cap 13 is provided at the upper end of the connected two hollow cylindrical cases 9 (namely, casing 4) and a bottom cap 14 is provided at the lower end of the connected two hollow cylindrical cases 9 (namely, casing 4) in such a state as interposing O-rings 15 and 16, respectively. Furthermore, a top opening 13*a* is formed at the top cap 13 and an untreated liquid feeding port 14*a* is formed at the bottom cap 14. Moreover, a purified liquid recovery port 9*c* is formed at the hollow cylindrical case 9 (the upper case).

In the filter 1, when an untreated liquid (liquid to be treated) is supplied into a plurality of the cells of the filter element 2 (the lower element) from the untreated liquid supplying port 14*a* of the bottom cap 14 under a given pressure, the untreated liquid passes through the first opening 8*a* of the supporting plate 8 and also flows into a plurality of the cells of the filter element 2 (the upper filter element). In this case, the untreated liquid is filtered with the filtering membrane formed on the inner wall of a plurality of the cells of the filter element 2 and discharged as a purified liquid through the outer peripheral surface 2*a* of the filter element 2 into a space 12 formed between the outer peripheral surface 2*a* of the filter element and the inner peripheral surface 9*a* of the hollow cylindrical case 9.

The purified liquid which is filtered is collected in the space 12 formed between the outer peripheral surface 2*a* of the filter element (the lower filter element) and the inner peripheral surface 9*a* of the hollow cylindrical case 9 (the lower case), passes through the second opening 8*b* of the supporting plate 8 and flows into the space 12 formed between the outer peripheral surface 2*a* of the filter element 2 (the upper filter element) and the inner peripheral surface 9*a* of the hollow cylindrical case 9 (the upper case), and is finally recovered from the purified liquid recovery port 9*c* of the hollow cylindrical case 9 (the upper case).

Ordinarily, the filter 1 is used as a dead end type filter by closing the top opening 13*a* of the upper cap 13 by a certain lid member, but it may be used as a cross-flow type filter by constructing the filter so that the untreated liquid circulates through the filter by connecting the top opening 13*a* and the untreated liquid supplying port 14*a* of the bottom cap 14 by a piping or the like.

(2) Filter Module

The filter module of the present invention has a structure where the filter element is contained in a hollow cylindrical case in such a state as both end faces of the filter element being supported by a supporting plate and a first sealer is interposed between the filter element and the supporting plate. The connection of the filter elements with each other can be easily carried out by constructing the filter element in the form of a module. When this filter module is used, a filter having the structure where a plurality of filter elements are connected in series can be very simply constructed as in the case of the filter of the first invention. That is, a filter having a high treating ability with saving of space can be more simply and easily constructed.

Figure 6:
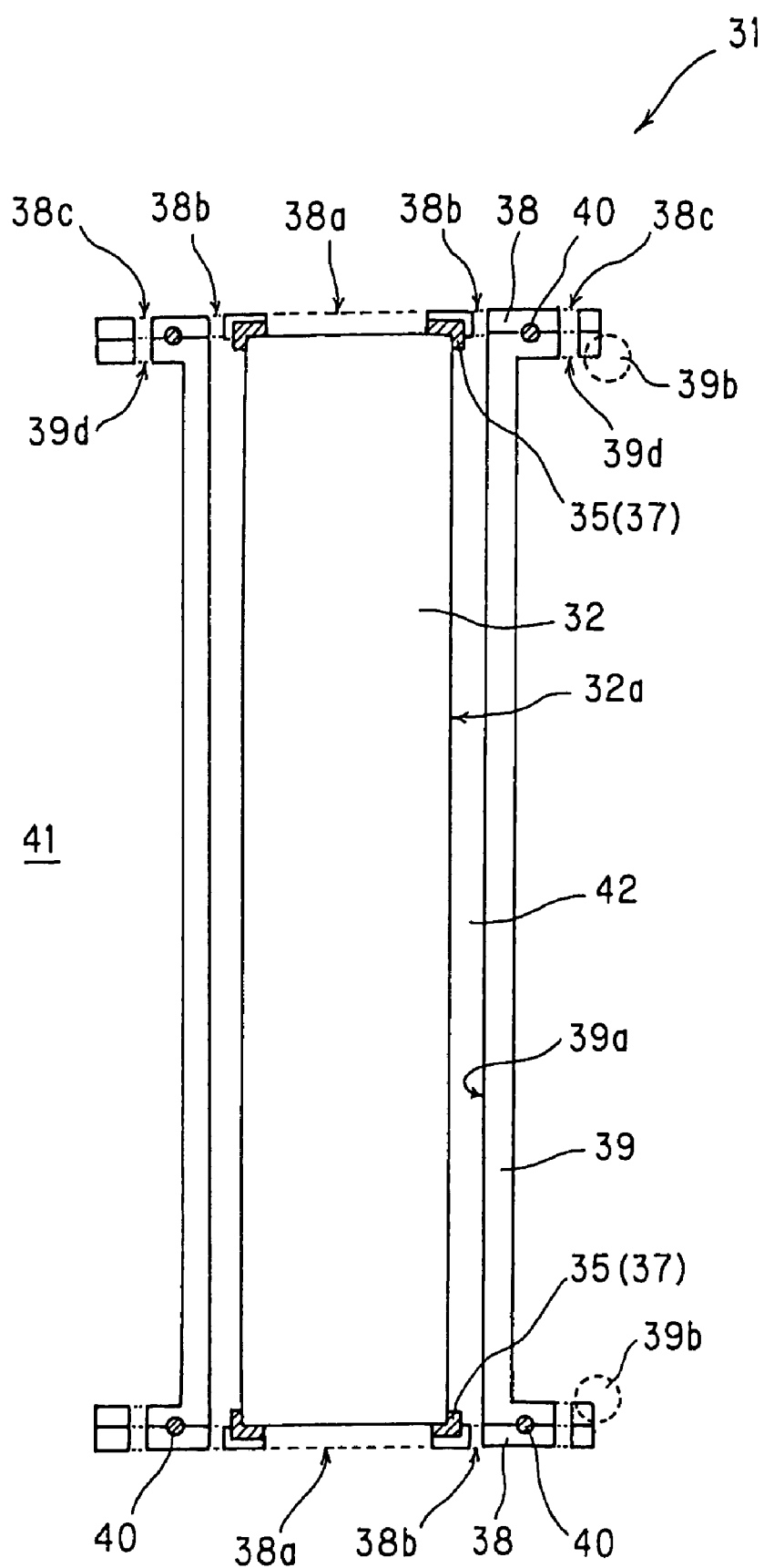
FIG. 6 is a side sectional view which schematically shows one embodiment of the filter module of the present invention.

The filter module of the present invention will be specifically explained referring to the drawings. FIG. 6 is a side sectional view which schematically shows one embodiment of the filter module of the present invention.

As shown in FIG. 6, in the filter module 31 of the present invention, filter element 32 is put in a hollow cylindrical case 39 having flanges 39*b* at both end parts, and specifically the filter module has the structure where the filter element 32 is put in the hollow cylindrical case 39 in such a state as the both end faces of the filter element being supported by a supporting plate 38 and a first sealer 35 is interposed between the filter element 32 and the supporting plate 38.

As to the construction of the filter element 32, the same construction as explained on the above-mentioned filter (element connection type) can be utilized as it is. Similarly, a coat comprising a liquid impermeable material (e.g., glass) is preferably formed on the end face of the filter element 32 other than the cell opening portion.

The supporting plate 38 has a first opening 38*a* which communicates with a plurality of the cells of the filter element 32 and a second opening 38*b* which communicates with a space 42 formed between the outer peripheral surface 32*a* of the filter element 32 and the inner peripheral surface 39*a* of the hollow cylindrical case 39. As to the construction of the supporting plate 38, the same construction as of the "supporting plate 8" explained on the above-mentioned filter (element connection type) can be utilized as it is (see FIG. 5).

It is necessary that the first sealer 35 has two functions of (1) liquid-tightly separating a plurality of the cells (of the filter element 32) from the space 42 formed between the outer peripheral surface 32*a* of the filter element 32 and the inner peripheral surface 39*a* of the hollow cylindrical case 39 and (2) not hindering a plurality of the cells of the filter element 32 from communicating with the first opening 38*a* (of the supporting plate 38).

As to the construction of the first sealer 35, the same construction as of "the first sealer 5" explained on the above-mentioned filter (element connection type) can be utilized as it is. Similarly, the first sealer 35 is preferably a seal cap (see FIG. 3(*a*) and FIG. 3(*b*), and FIG. 4(*a*) and FIG. 4(*b*)). In the filter module 31 shown in FIG. 6, a seal cap 37 is used as the first sealer 35.

It is preferred that the filter module of the present invention has a structure where a second sealer 40 is interposed between both flanges 39*b* of the hollow cylindrical case 39 and the supporting plate 38 as shown in FIG. 6.

It is necessary that the second sealer 40 has two functions of (1) liquid-tightly separating the space 42 formed between the outer peripheral surface 32*a* of the filter element 32 and the inner peripheral surface 39*a* of the hollow cylindrical case 39 from the external space 41 of the hollow cylindrical case 39 and (2) not hindering the space 42 formed between the outer peripheral surface 32*a* of the filter elements 32 from communicating with the inner peripheral surface 39*a* of the hollow cylindrical case 39. As to the construction of the second sealer 40, the same construction as of "the second sealer 10" explained on the above-mentioned filter (element connection type) can be utilized as it is.

A dented groove for disposing and fixing the second sealer may also be provided at the flange of the hollow cylindrical case and/or the supporting plate in the filter module of the present invention as in the case of the above-mentioned filter (element connection type) (in the filter module 31 shown in FIG. 6, a dented groove for disposing and fixing the second sealer 40 is provided at the flange 39*b* of the hollow cylindrical case 39 and the supporting plate 38).

The method of fixing the hollow cylindrical case and the supporting plate is not particularly limited, and there is a method by which a bolt hole 39*d* and a bolt hole 38*c* are made in the portions of the flange 39*b* of the hollow cylindrical case 39 and the supporting plate 38 which are on the outer peripheral side of the portion where the second sealer 40 is disposed, and the hollow cylindrical case and the supporting plate are fixed by a bolt and a nut as shown in FIG. 6.

Figure 7A:
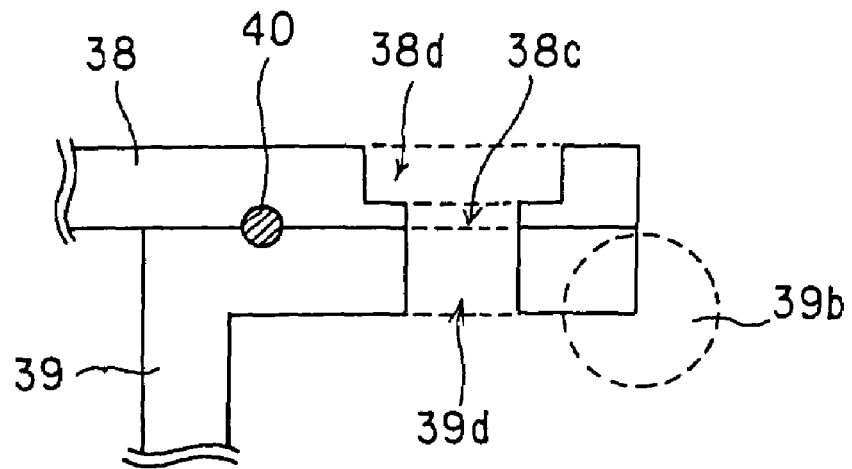
FIG. 7(a) and FIG. 7(b) schematically show one embodiment of the filter module of the present invention, which are enlarged views of the portion at which the flange of the hollow cylindrical case and the supporting plate are bonded.
Figure 7B:
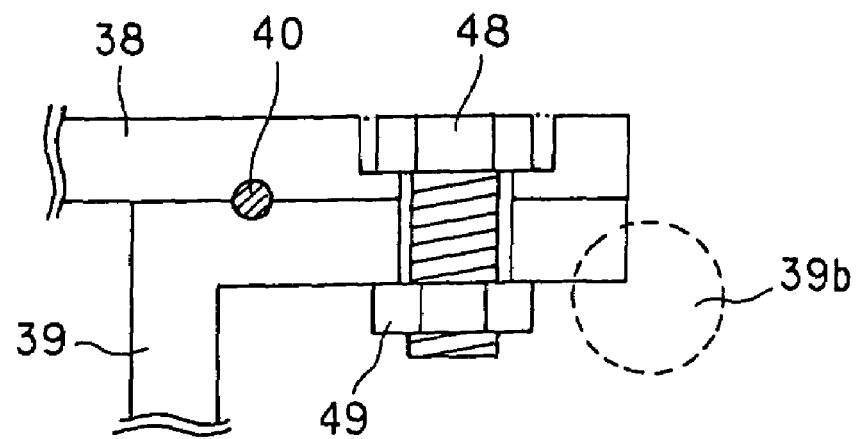

More specifically, as shown in FIG. 7(a) and FIG. 7(b), the structure may be such that the supporting plate 38 and the flange 39b of the hollow cylindrical case 39 have a bolt hole 38c into which a bolt 48 for bonding the supporting plate and the flange can be screwed, and especially preferably a dent 38d in which the head of the bolt 48 can be put is formed at the bolt hole 38c of the supporting plate 38.

By employing the above structure, the flange 39b of the hollow cylindrical case 39 and the supporting plate 38 can be fixed by the bolt 48 and the nut 49, and in addition, the head of the bolt 48 does not protrude from the surface of the supporting plate 38. Therefore, the head of the bolt does not obstruct the connection of a plurality of filter modules in series to construct a filter, and thus it becomes possible to connect a plurality of filter modules in series in the state of surely connecting the respective supporting plates of the filter modules with each other.

(3) Filter (Module Connection Type)

The filter (module connection type) of the present invention is a filter having at least two filter modules mentioned above, which are connected in series. The filter having such a structure can also be installed effectively utilizing the space in upper and lower directions as in the case of the filter (element connection type), and hence can be enhanced in throughput capacity per installing area, and is a filter large in throughput capacity with saving of space. Furthermore, since the filter element is in the form of a module, the connection between the filter elements can be easily performed, and the filter of large throughput capacity with saving of space as mentioned above can be more simply and easily constructed.

Figure 8:
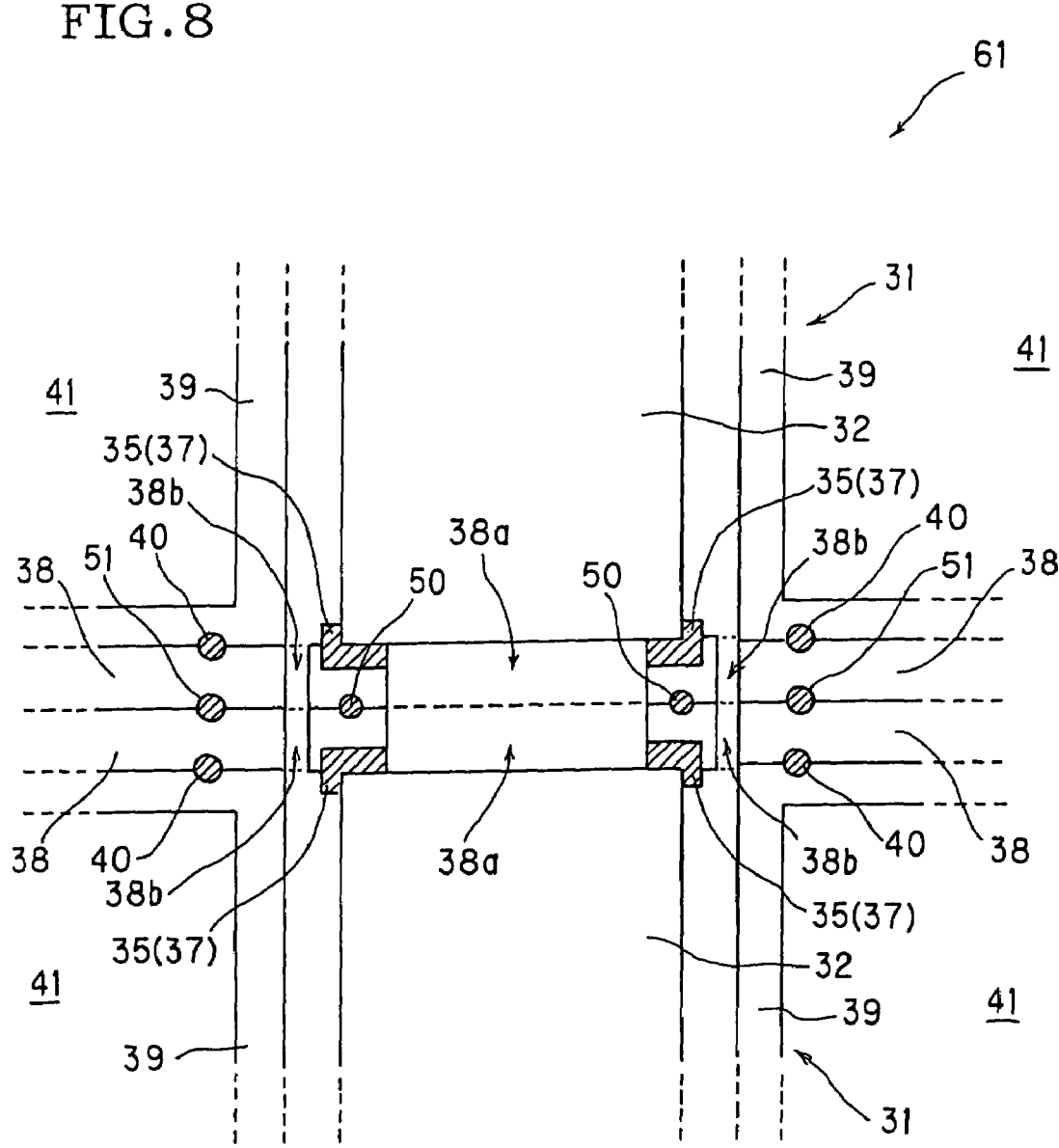
FIG. 8 schematically shows one embodiment of the filter of the present invention, which is an enlarged side sectional view of the connected portion of two filter modules.

The filter (module connection type) of the present invention will be specifically explained referring to the drawings. FIG. 8 is a side sectional view which schematically shows one embodiment of the filter of the present invention and is an enlarged view of the connected portion of the two filter modules. The filter modules 32 shown FIG. 8 has the same structure as of the filter module 32 shown in FIG. 6.

As shown in FIG. 8, the filter 61 of the present invention has at least two filter modules 31 of the present invention mentioned above, which are connected in series in such a state as interposing a third sealer 50 and a fourth sealer 51 between them.

It is necessary that the third sealer 50 has two functions of (1) liquid-tightly separating the first opening 38a (of the supporting plate 38) from the second opening 38b of the supporting plate 38 constituting at least two filter modules 31 and (2) not hindering the first openings 38a (of the supporting plate 38) of at least two filter modules 31 from communicating with each other.

As far as the third sealer has the above two functions, the shape, structure and constituent material of the third sealer are not particularly limited, and it may be, for example, an O-ring or a ring-shaped flat packing made of an elastic material such as rubber. In this case, a dented groove for disposing and fixing the third sealer may be provided at the supporting plate constituting each filter module (in the filter module 31 shown in FIG. 8, a dented groove for disposing and fixing the third sealer 50 is also provided at the supporting plate 38 constituting the filter module 31).

It is necessary that the fourth sealer 51 has two functions of (1) liquid-tightly separating the second opening 38b of the supporting plate 38 constituting at least two filter modules 31 from the external space 41 of at least two filter modules 31 and (2) not hindering the second openings 38b (of the supporting plate 38) of at least two filter modules 31 from communicating with each other.

As far as the fourth sealer has the above two functions, the shape, structure and constituent material of the fourth sealer are not particularly limited, and it may be, for example, an O-ring or a ring-shaped flat packing made of an elastic material such as rubber. In this case, a dented groove for disposing and fixing the fourth sealer may be provided at the supporting plate constituting each filter module (in the filter module 31 shown in FIG. 8, a dented groove for disposing and fixing the fourth sealer 51 is also provided at the supporting plate 38 constituting the filter module 31).

In the filter of the present invention (module connection type), a structure can be considered where a purified liquid recovery port is provided at each of at least two modules connected in series, but preferred is a structure where the purified liquid recovery port is provided at only the filter module connected at the uppermost part of the filter. Such structure has the merit that the piping equipment can be simplified as compared with the structure where the purified liquid recovery port is provided at each of the filter modules. Moreover, such structure has the merit that removal of air from the filter modules (namely, the filter) is easier as compared with, for example, a structure where a purified liquid recovery port is provided at only the filter module connected at the lowermost part of the filter.

The whole structure of the filter of the present invention (module connection type) is not particularly limited, and, for example, as in the case of the filter 1 shown in FIG. 1, a top cap having a top opening part is provided at the upper end of the connected at least two filter modules and a bottom cap having an untreated liquid supplying port is provided at the lower end in the state of interposing O-rings, respectively, see FIG. 1).

INDUSTRIAL APPLICABILITY

As explained above, the filter and filter module of the present invention are large in throughput capacity per installing area with saving of space, and hence are particularly suitable for treatment of a large quantity of untreated liquid (untreated water) such as in water treatment plant.

The invention claimed is:

1. A filter which has at least two filter elements having a substrate comprising a cylindrical porous body having many pores and having a plurality of cells as flow paths for untreated liquid and a filtering membrane comprising a porous body smaller in average pore diameter than that of the substrate and formed on the inner wall of a plurality of the cells, and said at least two filter elements are contained in a casing, wherein said at least two filter elements contained in the casing are connected in series in such a state as interposing a first sealer between them, and the first sealer separates liquid-tightly a plurality of the cells from a space formed between the outer peripheral surface of said at least two filter elements and the inner peripheral surface of the casing and does not hinder a plurality of the cells of said at least two filter elements from communicating with each other, wherein the first sealer is a seal cap.

2. A filter according to claim 1, wherein the substrate and filtering membrane constituting the filter elements comprise a ceramic.

3. A filter according to claim 1, wherein said at least two filter elements are connected in series in such a state as providing a supporting plate between them, the first sealer is interposed between said at least two filter elements and the supporting plate, and the supporting plate has a first opening which allows a plurality of the cells of said at least two filter elements to communicate with each other and a second opening which allows the spaces formed between the outer peripheral surface of said at least two filter elements and the inner peripheral surface of the casing to communicate with each other.

4. A filter according to claim 3, wherein the casing comprises at least two hollow cylindrical cases having a flange at the end part, said at least two hollow cylindrical cases are connected in series in such a state as providing the supporting plate between the flanges, a second sealer is interposed between the flange and the supporting plate, the second sealer liquid-tightly separates a space formed between the outer peripheral surface of said at least two filter elements and the inner peripheral surface of the hollow cylindrical case from the external space of the hollow cylindrical case and does not hinder the spaces formed between the outer peripheral surface of said at least two filter elements and the inner peripheral surface of the hollow cylindrical case from communicating with each other.

5. A filter module in which a filter element having a substrate comprising a cylindrical porous body having many pores and having a plurality of cells as flow paths for untreated liquid and a filtering membrane comprising a porous body smaller in average pore diameter than that of the substrate and formed on the inner wall of a plurality of the cells is contained in a hollow cylindrical case having flanges at both end parts, wherein the filter element is contained in the hollow cylindrical case in such a state as both end faces being supported by a supporting plate and a first sealer is interposed between the filter element and the supporting plate; the supporting plate has a first opening communicating with a plurality of the cells of the filter element and a second opening communicating with a space formed between the outer peripheral surface of the filter element and the inner peripheral surface of the hollow cylindrical case; and the first sealer liquid-tightly separates a plurality of the cells from the space formed between the outer peripheral surface of the filter element and the inner peripheral surface of the hollow cylindrical case and does not hinder a plurality of the cells of the filter element and the first opening from communicating with each other.

6. A filter module according to claim 5, wherein the substrate and filtering membrane constituting the filter element comprise a ceramic.

7. A filter module according to claim 5, wherein the first sealer is a seal cap.

8. A filter module according to claim 5, wherein a second sealer is interposed between both the flanges of the hollow cylindrical case and the supporting plate, and the second sealer liquid-tightly separates a space formed between the outer peripheral surface of the filter element and the inner peripheral surface of the hollow cylindrical case from the external space of the hollow cylindrical case and does not hinder the second opening of the supporting plate and the space formed between the outer peripheral surface of the filter element and the inner peripheral surface of the hollow cylindrical case from communicating with each other.

9. A filter module according to claim 8, wherein the supporting plate and the flanges of the hollow cylindrical case have a bolt hole into which a bolt for bonding the supporting plate and the flange can be screwed, and a dent in which the head of the bolt can be put is formed at the bolt hole of the supporting plate.

10. A filter having at least two filter modules which are connected in series; each of said at least two filter modules comprising a filter element having a substrate comprising a cylindrical porous body having many pores and having a plurality of cells as flow paths for untreated liquid and a filtering membrane comprising a porous body smaller in average pore diameter than that of the substrate and formed on the inner wall of a plurality of the cells is contained in a hollow cylindrical case having flanges at both end parts, wherein the filter element is contained in the hollow cylindrical case in such a state as both end faces being supported by a supporting plate and a first sealer is interposed between the filter element and the supporting plate; the supporting plate has a first opening communicating with a plurality of the cells of the filter element and a second opening communicating with a space formed between the outer peripheral surface of the filter element and the inner peripheral surface of the hollow cylindrical case; and the first sealer liquid-tightly separates a plurality of the cells from the space formed between the outer peripheral surface of the filter element and the inner peripheral surface of the hollow cylindrical case and does not hinder a plurality of the cells of the filter element and the first opening from communicating with each other, wherein said at least two filter modules are connected in series in such a state as interposing a third sealer and a fourth sealer between them, the third sealer liquid-tightly separates the first opening from the second opening of the supporting plate constituting said at least two filter modules and does not hinder the first openings of said at least two filter modules from communicating with each other, and the fourth sealer liquid-tightly separates the second opening of the supporting plate constituting said at least two filter modules from the external space of the filter modules and does not hinder the second opening of said at least two filter modules from communicating with each other.

11. A filter according to claim 10, wherein a purified liquid recovery port is provided at only the filter module connected at the uppermost part of the filter among said at least two filter modules connected in series.

12. A filter according to claim 10, wherein a second sealer is further interposed between both the flanges of the hollow cylindrical case and the supporting plate, and the second sealer liquid-tightly separates a space formed between the outer peripheral surface of the filter element and the inner peripheral surface of the hollow cylindrical case from the external space of the hollow cylindrical case and does not hinder the second opening of the supporting plate and the space formed between the outer peripheral surface of the filter element and the inner peripheral surface of the hollow cylindrical case from communicating with each other.

* * * * *